United States Patent [19]

Teshigawara et al.

[11] Patent Number: 5,495,658
[45] Date of Patent: Mar. 5, 1996

[54] METHOD OF MAKING CYLINDRICAL FERROMAGNETIC BODY AND COVER ASSEMBLY FOR ROTOR OF DC MOTOR

[75] Inventors: Toshiyuki Teshigawara, Maebashi; Yoshikazu Kokubun, Gunma, both of Japan

[73] Assignee: Sanden Corp., Isesaki, Japan

[21] Appl. No.: 274,636

[22] Filed: Jul. 13, 1994

[30] Foreign Application Priority Data

Jul. 16, 1993 [JP] Japan .................................. 5-197710

[51] Int. Cl.$^6$ ................................................ H02K 15/02
[52] U.S. Cl. .......................... 29/598; 29/608; 264/272.2; 310/43; 310/156
[58] Field of Search ............................. 29/598, 596, 608; 310/42, 43, 45, 156; 264/272.2, 272.19, 272.15

[56] References Cited

U.S. PATENT DOCUMENTS

| | | | |
|---|---|---|---|
| 4,742,259 | 5/1988 | Schaefer et al. | 310/156 |
| 4,973,872 | 11/1990 | Dohogne | 310/156 |
| 5,040,286 | 8/1991 | Stark | 29/598 |
| 5,144,735 | 9/1992 | Stark | 29/732 |

FOREIGN PATENT DOCUMENTS 2-97244  4/1990  Japan .

Primary Examiner—Carl E. Hall
Attorney, Agent, or Firm—Kenjiro Hidaka

[57] ABSTRACT

A method of making a cylindrical ferromagnetic body and cover assembly for a rotor of a dc motor is provided. In a first embodiment, a blend of a powdered ferromagnetic material and a heat-curable binder is compressedly molded into a cylindrical form in a generally cylindrical non-magnetic cover material having an annular flange around the top thereof, while heat is applied to the material from a heated stationary mold through the cover material, so that the cylindrically-molded ferromagnetic body firmly adheres to the cover material in the molding process. After the ferromagnetic body is cured, an non-magnetic annular protector is placed on the top of the cylindrically-molded body and the annular flange is radially inwardly bent over onto the protector. In a second embodiment, a heated block of a powdered ferromagnetic material is deposited in a cup-shaped non-magnetic cover material. The block is subsequently pressedly molded into a cup-shaped form in the cup-shaped cover material so that the molded material firmly adheres to the cover material. After the molded material is cooled, a top section and a bottom section of the cup-shaped body, together with the corresponding top section and the bottom section of the cover material, are cut off so as to obtain a cylindrical ferromagnetic body and cover assembly.

8 Claims, 20 Drawing Sheets

5,495,658

METHOD OF MAKING CYLINDRICAL FERROMAGNETIC BODY AND COVER ASSEMBLY FOR ROTOR OF DC MOTOR

BACKGROUND OF THE INVENTION

1. Field of the Invention

The present invention relates to a method of making a cylindrical ferromagnetic body and cover assembly that is used for making a permanent-magnet rotor of a dc brushless motor.

2. Description of the Prior Art

A conventional permanent-magnet rotor of a dc brushless motor has a cylindrical iron core for providing magnetic flux paths and a cylindrical permanent magnet, or a plurality of arcuate permanent magnets, coaxially positioned around the iron core and bonded thereto.

The permanent magnet is externally covered with a non-magnetic cylindrical protective sleeve or cover so that the permanent magnet may be prevented from being damaged while the rotor is assembled to the stator or any magnet fragments may be kept from scattering when the permanent magnet is accidentally broken while it is in rotation. The use of a cylindrical protective cover is particularly necessary in the case a magnet containing a plastic binder is used because such a magnet is more likely to be accidentally damaged. In order to obtain a good dynamic balancing of the rotor, the magnet and the cylindrical cover must be dimensionally very precisely and physically very tightly assembled with each other.

One of the conventional methods is disclosed by Stark in U.S. Pat. Nos. 5,040,286 and 5,144,735, in which a cylindrical retaining shell is axially cold-pressed over an assembly of cylindrically arranged arcuate magnetizable elements. The inside diameter of the retaining shell is slightly smaller than the outside diameter of the assembly of the magnetizable elements so that the retaining shell is radially outwardly stretched, thereby tightly retaining the magnetizable elements.

Another conventional method is to cover the cylindrical magnet or magnetizable material with a cylindrical sleeve by a heat-shrinking method.

The problems to be solved

However, the cold-pressing method requires a very strict machining tolerance of the cylindrical cover and the heat-shrinking method requires a strict temperature control so that the cylindrical cover may not be damaged or overly strained.

Furthermore, both of the above mentioned cold-pressing method and the heat-shrinking method require extra process steps in addition to the steps for forming or making the magnetizable material or the magnet.

SUMMARY OF THE INVENTION

The present invention was accomplished with a view to the above described problems pertaining to the conventional methods.

A primary object of the present invention is to provide a method of making a cylindrical ferromagnetic body and cover assembly that is used for a permanent-magnet rotor of a dc brushless motor without overly strict machining tolerances or a strict temperature control.

Another object of the present invention is to provide a method of making a cylindrical ferromagnetic body and cover assembly in which the total number of steps for producing the assembly is reduced as compared with those of conventional methods.

In order to achieve the above objects, the method of making a cylindrical ferromagnetic body and cover assembly for a rotor of a dc motor is provided in two embodiments.

In the first embodiment, a blend of a powdered ferromagnetic material and a heat-curable binder is compressedly molded into a cylindrical form in a generally cylindrical non-magnetic metal cover material having a cylindrical body and an annular flange around the top of the cylindrical body, while heat is applied to the material from a heated stationary mold through the cover material, so that the cylindrically-molded ferromagnetic body firmly adheres to the cylindrical body of the cover material in the molding process. After the cylindrically-molded ferromagnetic body is cured, a non-magnetic annular protector is placed on the top of the cylindrically-molded ferromagnetic body, and the annular flange of the cover material is radially inwardly bent over onto the protector to secure the protector on the cylindrically-molded ferromagnetic body.

In the second embodiment, a heated hot-pressed block of a powdered ferromagnetic material is deposited in a cup-shaped non-magnetic metal cover material. The block is subsequently pressedly molded into a cup-shaped form in the cup-shaped cover material, so that the cup-shaped ferromagnetic body firmly adheres to the cover material in the molding process. After the cup-shaped ferromagnetic body is cooled, a top section and a bottom section of the molded cup-shaped ferromagnetic body, together with the corresponding top section and the bottom section of the cover material, are cut off so as to obtain a cylindrical ferromagnetic body and cover assembly.

DESCRIPTION OF THE PREFERRED EMBODIMENTS

Now, the first embodiment of the method of making a cylindrical ferromagnetic body and cover assembly for a permanent-magnet rotor of a dc motor, according to the present invention, will be described, step by step, in reference to FIGS. 1 to 10.

Figure 1:
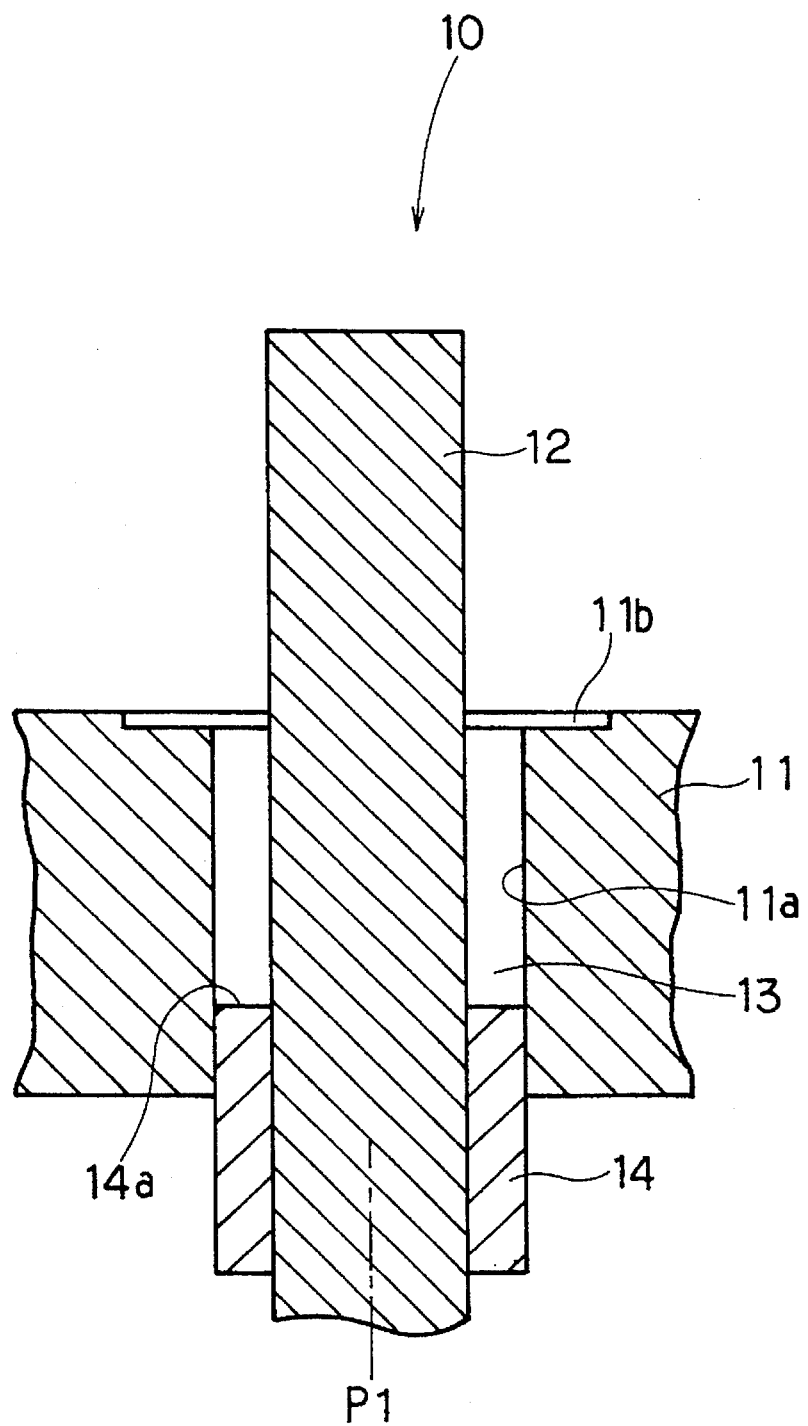
FIG. 1 is an elevational sectional view of a part of a forming apparatus of the method of making a cylindrical ferromagnetic body and cover assembly for a permanent-magnet rotor of a dc motor, according to the first embodiment of the present invention.

Referring to FIG. 1, a forming apparatus 10 has a steel-made stationary metal mold 11 and a steel-made columnar guide 12. The stationary metal mold 11 has a vertical columnar bore 11a extending therethrough having an imaginary center axis P1. The columnar guide 12 has a substantially smaller diameter than the diameter of the bore 11a and is disposed through the bore 11a coaxially therewith, thereby forming a cylindrical space 13 defined by the cylindrical side surface of the columnar guide 12 and the cylindrical periphery of the bore 11a. The stationary metal mold 11 has, at a top thereof and around the bore 11a, has an annular recess 11b.

The forming apparatus 10 further includes a steel-made first moveable cylindrical metal mold 14, having a top surface 14a, which is slidably mounted on the guide 12 coaxially with the guide 12 and the bore 11a . The cylindrical mold 14 has an external diameter slightly smaller than the diameter of said bore 11a and an internal diameter slightly greater than the diameter of said columnar guide 12, so that the cylindrical mold 14 can axially slide on the guide 12 within the cylindrical space 13 while maintaining contacts with the cylindrical side surface of the columnar guide 12 and the periphery of the bore 11a.

Figure 2:
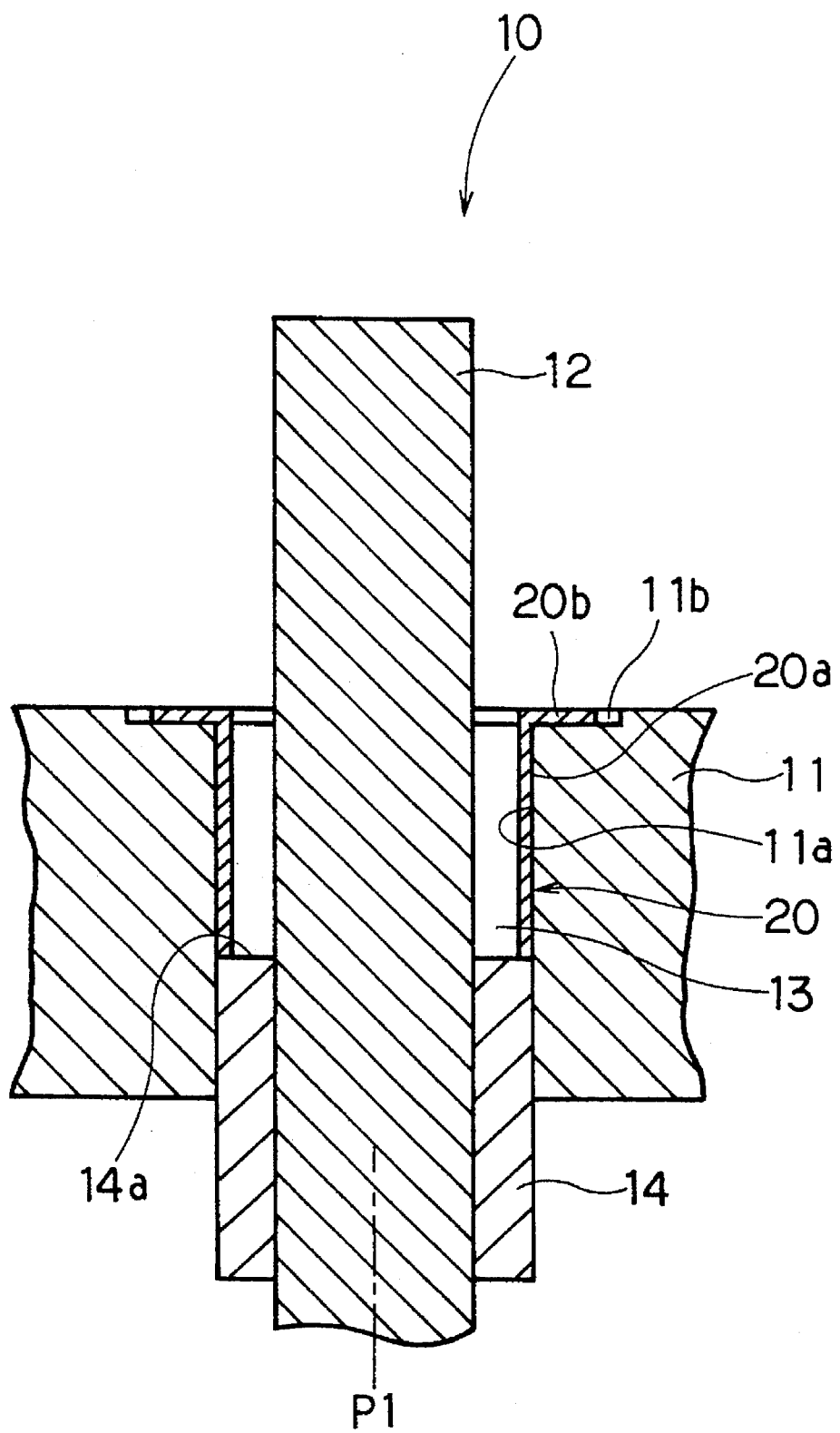
FIG. 2 is an an elevational sectional view of a part of the apparatus and a material in step 1 of the method.

Step 1: Referring to FIG. 2, a generally cylindrical cover 20, made of a non-magnetic stainless steel, is first prepared. The cover 20 has a cylindrical body 20a and, around the top thereof, a radially outwardly extending annular flange 20b. The exterior diameter of the cylindrical body 20a is slightly smaller than the diameter of the bore 11a, and the flange 20b has proper dimensions so as to exactly fit and rest in the annular recess 11b of the stationary mold 11. Then, the cover 20 is placed in the top section of the bore 11a (or, the cylindrical space 13) in a manner that the cylindrical body 20a is inserted to the bore 11a with, the bottom end thereof directly on the top surface 14a of the cylindrical moveable metal mold 14, the flange 20b rests in the recess 11b and the top surface of the flange 20b is flash with the top surface of the stationary mold 11. At this time, the bottom end of the cylindrical moveable metal mold 14 is kept at a level lower than the level of the bottom end of the stationary mold 11, as shown in FIG. 2.

The flange 20b is formed by a press-forming method beforehand. Therefore, the tolerance of the axial dimension of the cylindrical body 20a of the cover 20 below the flange 20b is assured by controlling the tolerance of the dimensions of the molds used for the press-forming.

Figure 3:
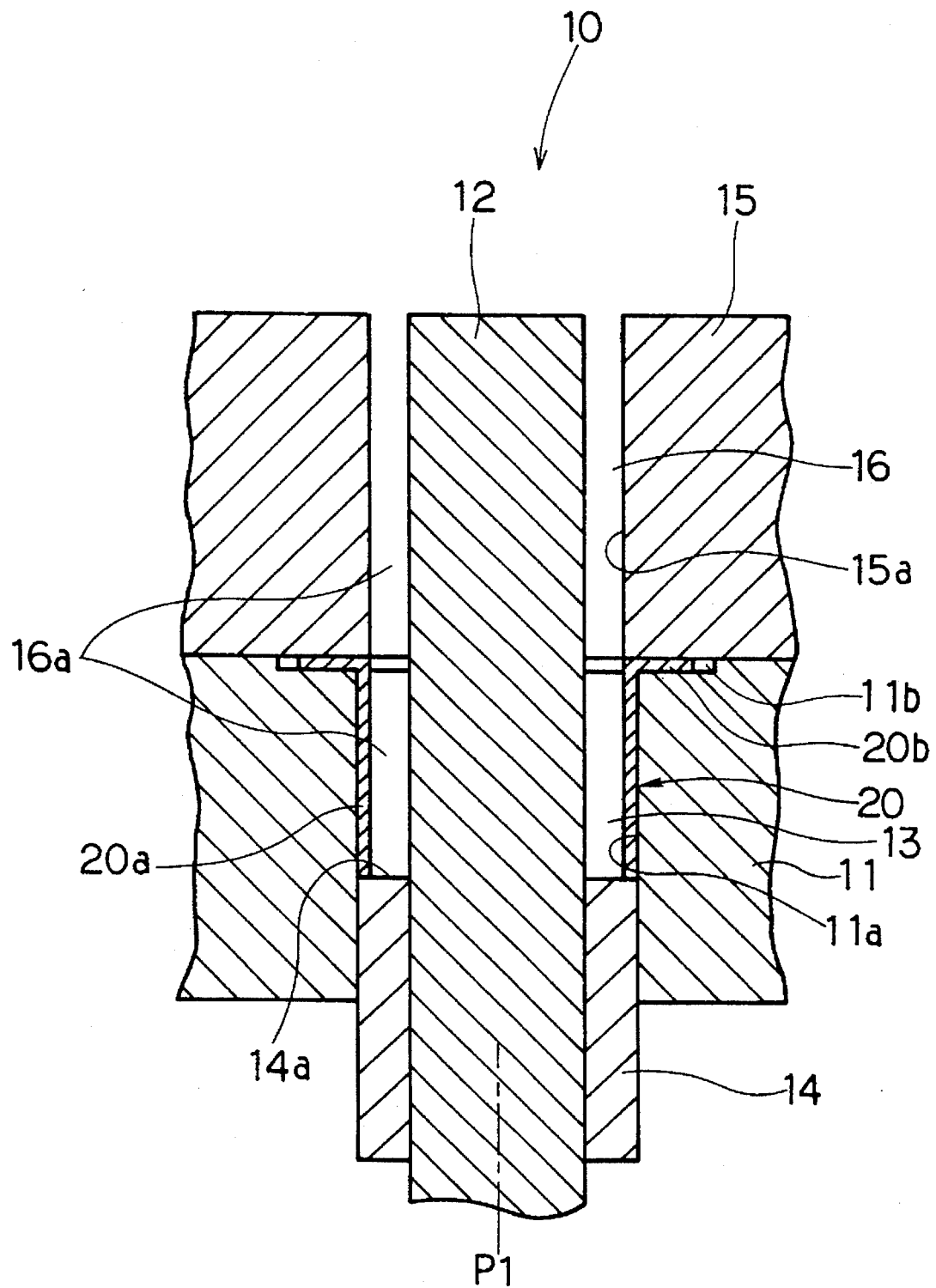
FIG. 3 is an elevational sectional view of a part of the apparatus and the material in step 2 subsequent to step 1.

Step 2: Referring to FIG. 3, a second moveable metal mold 15 having a cylindrical bore 15a is prepared. This mold 15 is placed onto the tops of the stationary mold 11 and the flange 20b in a manner that the columnar guide 12 is within the bore 15a coaxially therewith, as shown in FIG. 3. When the mold 15 is placed on the stationary mold 11, the columnar guide 12, the bore 15a, the bore 11a and the cylindrical body 20a are axially aligned with one another having the center axis P1 in common. There now is formed a cylindrical space 16 defined by the cylindrical side surface of the columnar guide 12 and the cylindrical periphery of the bore 15a, as shown in FIG. 3. Since the diameter of the bore 15a is substantially equal to the inside diameter of the cylindrical body 20a of the cover 20, the cylindrical space 16 actually extends through the cylindrical space inside the cylindrical body 20a, thereby forming an axially extended cylindrical through-space 16a that is defined by the cylindrical side surface of the columnar guide 12, the cylindrical periphery of the bore 15a, internal periphery of the cylindrical body 20a and the top surface 14a of the cylindrical first moveable metal mold 14.

Figure 4:
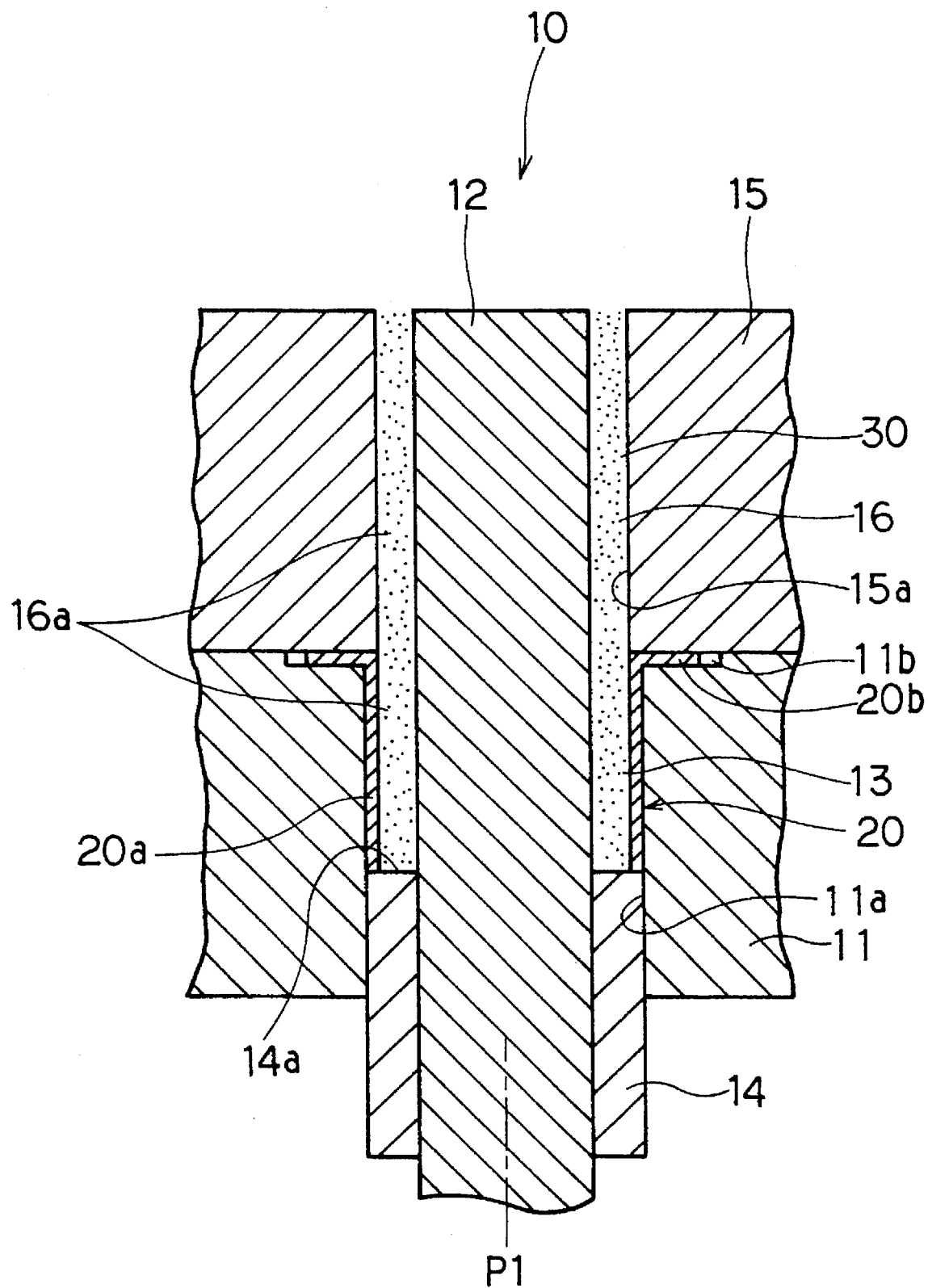
FIG. 4 is an elevational sectional views of a part of the apparatus and materials in step 3 subsequent to step 2.

Step 3: Referring to FIG. 4, a ferromagnetic material 30 of a predetermined weight quantity is deposited in the cylindrical through-space 16a. The material 30 is a blend of a Nd—Fe—B based ferromagnetic alloy powder and a heat-curable epoxy resin binder.

Figure 5:
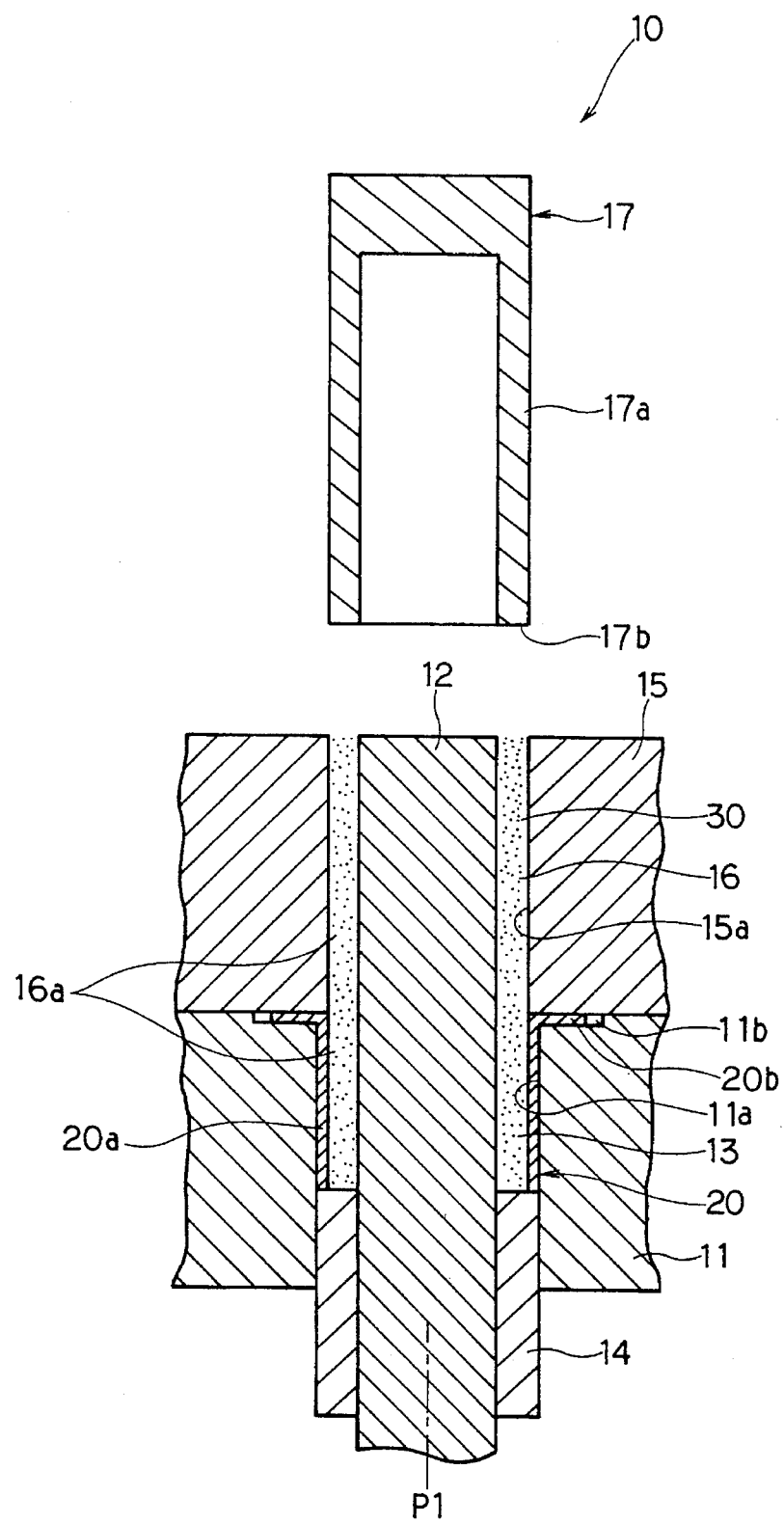
FIGS. 5 and 6 elevational sectional views of parts of the apparatus and the materials in step 4 subsequent to step 3.
Figure 6:
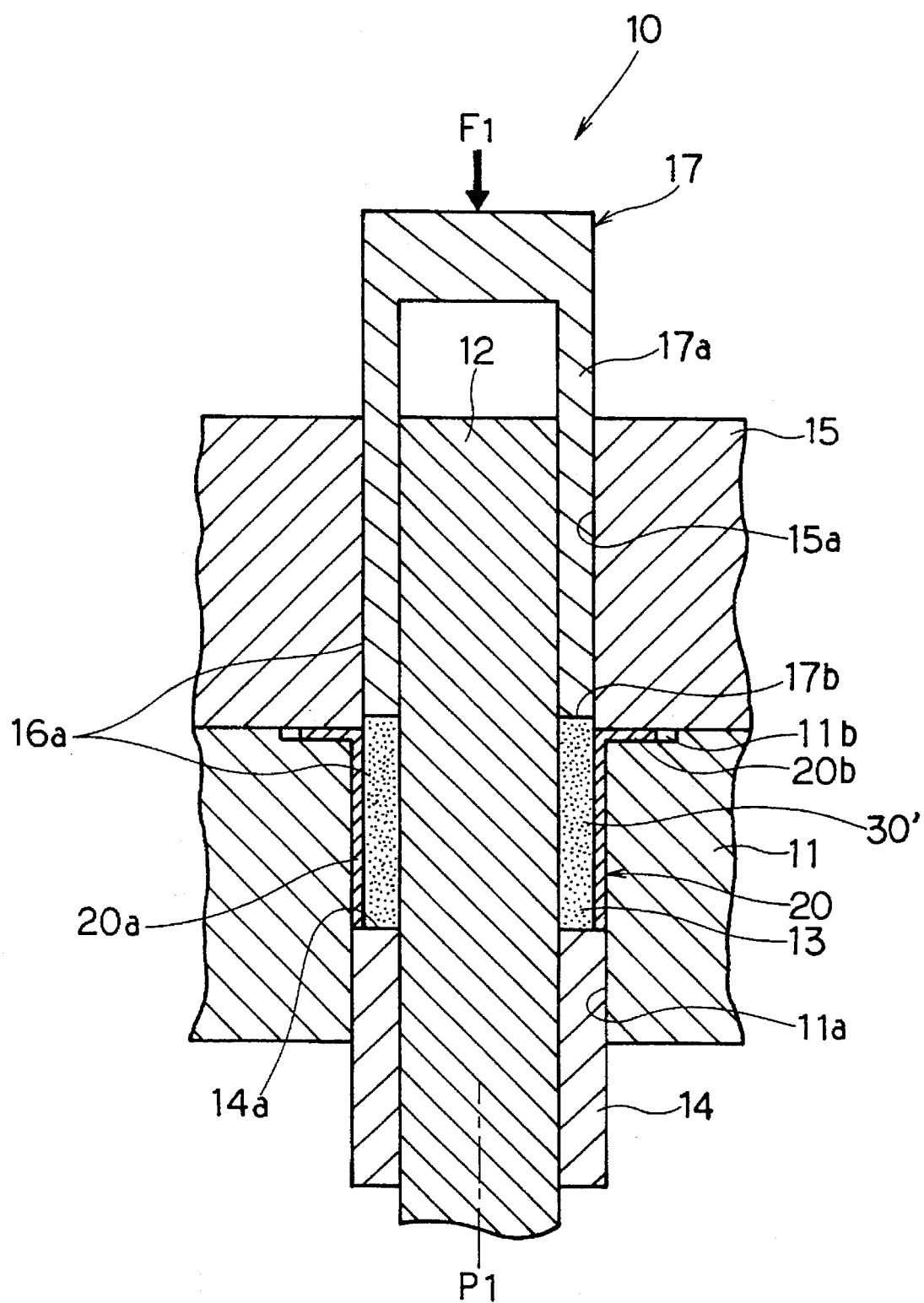

Step 4: Reference is now made to FIGS. 5 and 6. In this step, a third moveable metal mold 17 is used. The third moveable metal mold 17 consists substantially of a cylindrical part 17a with an open and flat bottom end 17b. The cylindrical part 17a has an external diameter slightly smaller than the diameter of the bore 15a and an internal diameter slightly greater than the diameter of the columnar guide 12. Subsequent to the step 3 above, the cylindrical part 17a of the third moveable metal mold 17 is inserted into the cylindrical space 16, filled with the material 30, from thereabove. The cylindrical part 17a can slide down along the cylindrical surface of the columnar guide 12 and the cylindrical periphery of the bore 15a coaxially therewith. Then, as shown in FIG. 6, the third moveable metal mold 17 is pressed down with a predetermined force $F_1$ until the bottom end 17b of the cylindrical part 17a reaches a level slightly higher than the level of the top surfaces of the flange 20b and the stationary mold 11. Consequently, the material 30 is compressed substantially into the cylindrical space 13 and radially substantially within the cylindrical body 20a of the cover 20, as shown in FIG. 6. At this time, the material 30 firmly adheres to the cylindrical body 20a of the cover 20 under the pressure. Consequently, the material 30 is transformed to a cylindrically-molded ferromagnetic material 30' that is securely attached by the cover 30.

On the other hand, tire stationary metal mold 11 is already heated up before the process of strep 4, so that the cover 20 in contact therewith is also heated up. Therefore, the epoxy resin binder in the compressed and molded material 30 will also be heated and cured, and this causes the Nd—Fe—B based alloy powder in the material 30 to be bonded by the epoxy resin binder, and the material 30 will be hardened.

As mentioned before, the flange 20b of the cover 20 is fitted in the annular recess 11b on top of the stationary mold 11. Therefore, the flange 20b actually caps the very small gap between the cylindrical body 20a of the cover 20 and the cylindrical periphery of the bore 11a, thereby preventing the powdered ferromagnetic material 30 from entering the gap.

Figure 7:
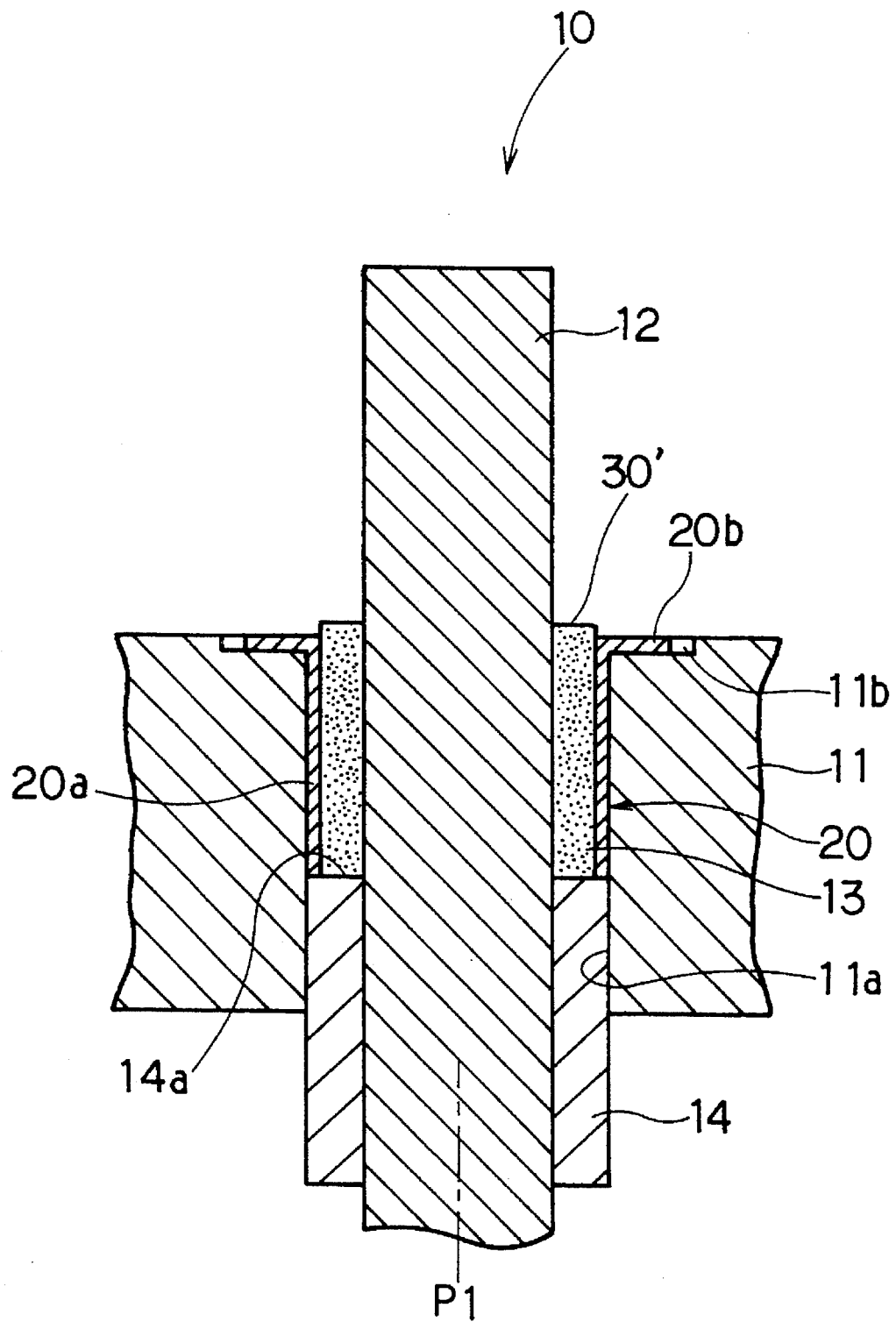
FIG. 7 is an elevational sectional view of a part of the apparatus and the materials in step 5 subsequent to step 4.

Step 5: Referring to FIG. 6, the third moveable metal mold 17 and the second moveable metal mold 15 are upwardly removed in this sequence, so that the forming apparatus 10 will be as shown in FIG. 7.

Figure 8:
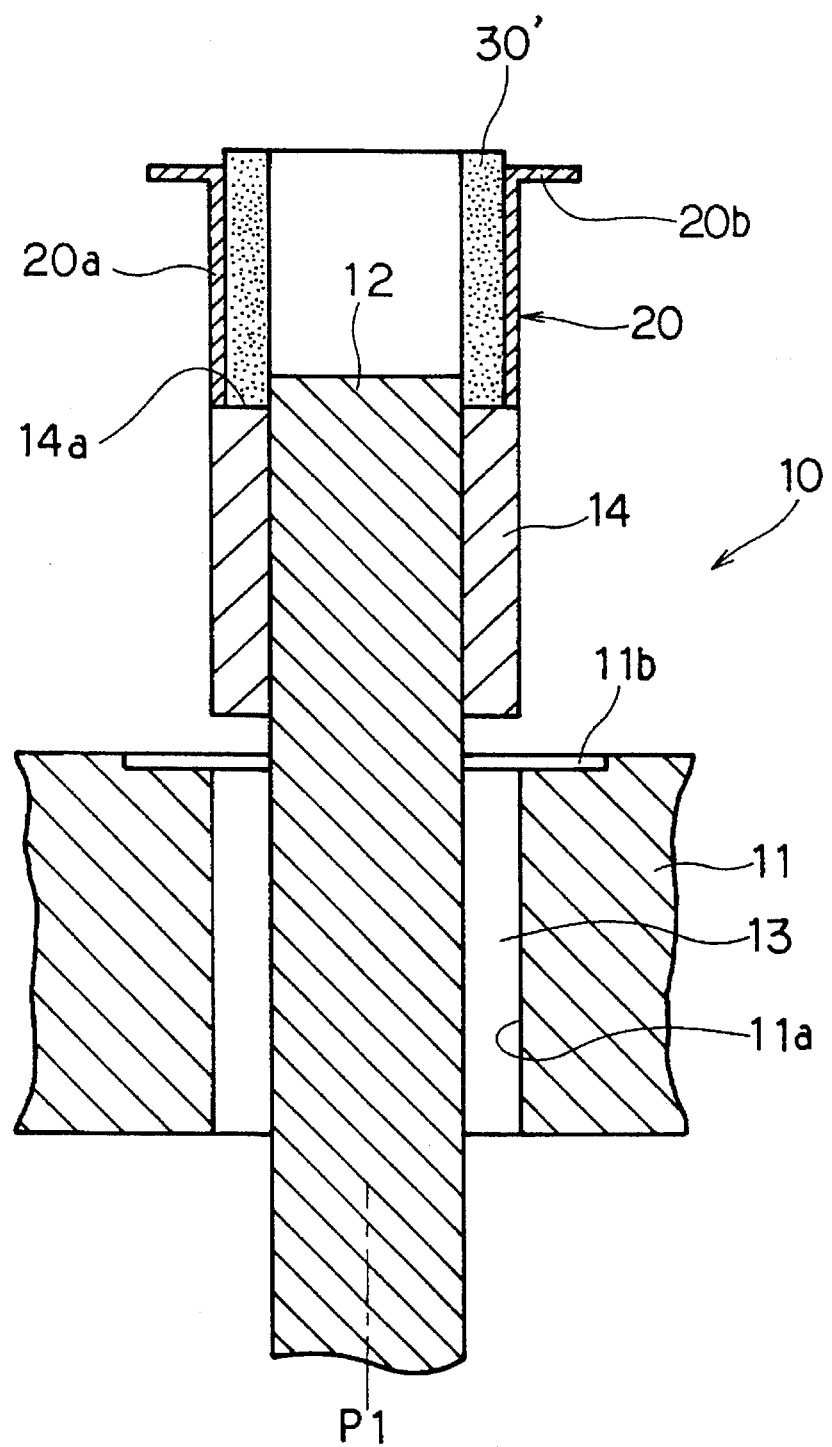
FIG. 8 is an elevational sectional view of a part of the apparatus and the materials in step 6 subsequent to step 5.

Step 6: Referring to FIG. 8, the first moveable metal mold 14 is upwardly moved so as to upwardly remove the cylindrically-molded ferromagnetic material 30' together with the cover 20 from the cylindrical space 13. At this time, the ferromagnetic material 30' is separated from the surface of the columnar guide 12 in its entirety without leaving any residual particles. Further, any residuals of the ferromagnetic material 30' which may exist between the bottom end of the cover 20 and the top surface 14a of the first moveable metal mold 14 is also removed.

Figure 9:
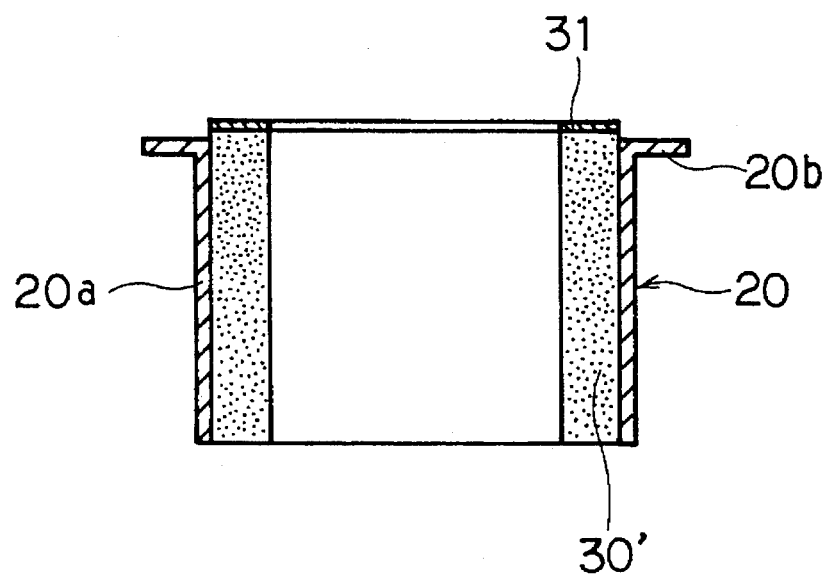
FIG. 9 is a view for step 7, showing an elevational sectional view of a formed ferromagnetic material and cover assembly produced according to steps 1 to 6 and an additional material.
Figure 10:
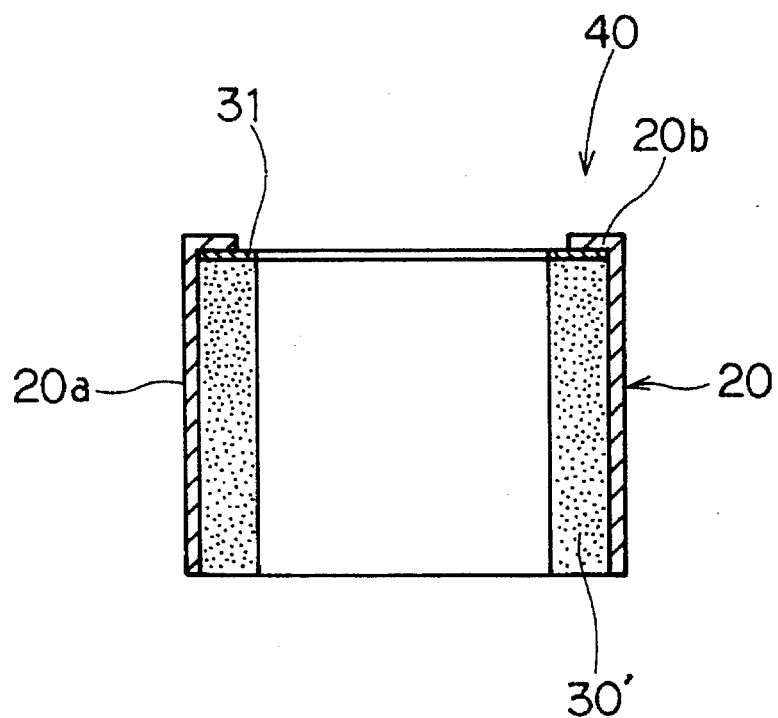
FIG. 10 is another view for step 7, showing an elevational sectional view of a cylindrical ferromagnetic body and cover assembly.

Step 7: Reference is now made to FIGS. 9 and 10. After the cylindrically-molded ferromagnetic material 30' with the cover 20 has been removed from within the space 13, an annular aluminum protector 31 is ]placed on the top of the ferromagnetic material 30', as shown in FIG. 9. The inside and the outside diameters of the protector 31 are equal to the inside and the outside diameters, respectively, of the ferromagnetic material 30'. Then, the flange 20b of the cover 20 is bent radially inwardly over to the top of the protector 31 by a press, as shown in FIG. 10. Consequently, the protector 31 is securely fixed on the top of the ferromagnetic material 30' so as to protect the top thereof. Thus, produced is a cylindrical ferromagnetic body and cover assembly 40 for a permanent-magnet rotor of a brushless dc motor, which consists of the ferromagnetic material 30', the cover 20 and the protector 31.

Thereafter, a cylindrical iron core (not shown) is securely fitted radially inside the cylindrical ferromagnetic body and cover assembly 40 and bonded thereto. The ferromagnetic material 30' is, then, magnetized by a magnetizing apparatus (not shown) in an isotropic state to obtain a core/permanent-magnet/cover assembly that will be used for a rotor of a dc brushless motor.

As explained above, the forming of the cylindrically-molded ferromagnetic material 30' and the attachment of the cylindrical cover 20 to the ferromagnetic material 30' are simultaneously performed in a single step. This process, therefore, can eliminate a conventional step of attaching a cylindrical cover onto a separately produced ferromagnetic material by means, for example, of a cold-pressing method or a heat-shrink fitting method.

Furthermore, since no cold-pressing method is used, tolerances of the diametrical dimensions of both the ferromagnetic material 30' and the cover 20 can comparatively be mitigated. In addition, since no heat-shrink fitting method is applied to, no strict temperature control is required.

According to this method of the present invention, a small gap exists between the cylindrical body 20a of the cover 20 and the periphery of bore 11a. Therefore, when the material 30 is compressed in the cylindrical through-space 16a by the third moveable metal mold 17, the cylindrical body 20a of the cover 20 is allowed to slightly expand radially and is biased radially outward. Consequently, as the cylindrical ferromagnetic body and cover assembly 40 is removed from the space 13 and is separated from the columnar guide 12, the cylindrical body 20a is inversely biased with a radially inward restituting force. This radially inward bias causes to improve the endurance characteristics pertaining to the shearing stress between the ferromagnetic material 30' and the cylindrical body 20a of the cover 20.

The coaxiality between the cover 20 and the cylindrically-molded ferromagnetic material 30' is always controlled in the manufacturing process according to the present invention. Therefore, the coaxiality can be substantially enhanced as compared to those obtained by one of the conventional methods, e.g. cold-pressing method or heat-shrink fitting method. This will limit the vibrations of a rotor employing the parts thus produced while the rotor is rotated, and the air-gap between the rotor and the stator can, therefore, be minimized. As the result, the flux density on the rotor is increased and, accordingly, the generated torque of the rotor will be increased. In other words, provided that the torque requirement of the motor is the same as before, the total diametrical dimension of the motor can be minimized by minimizing the air-gap between the rotor and the stator.

Next, the second embodiment of the method of making a cylindrical ferromagnetic body and cover assembly for a permanent-magnet rotor of a dc motor, according to the present invention, will be explained, step by step, in reference to FIGS. 11 to 22.

Figure 11:
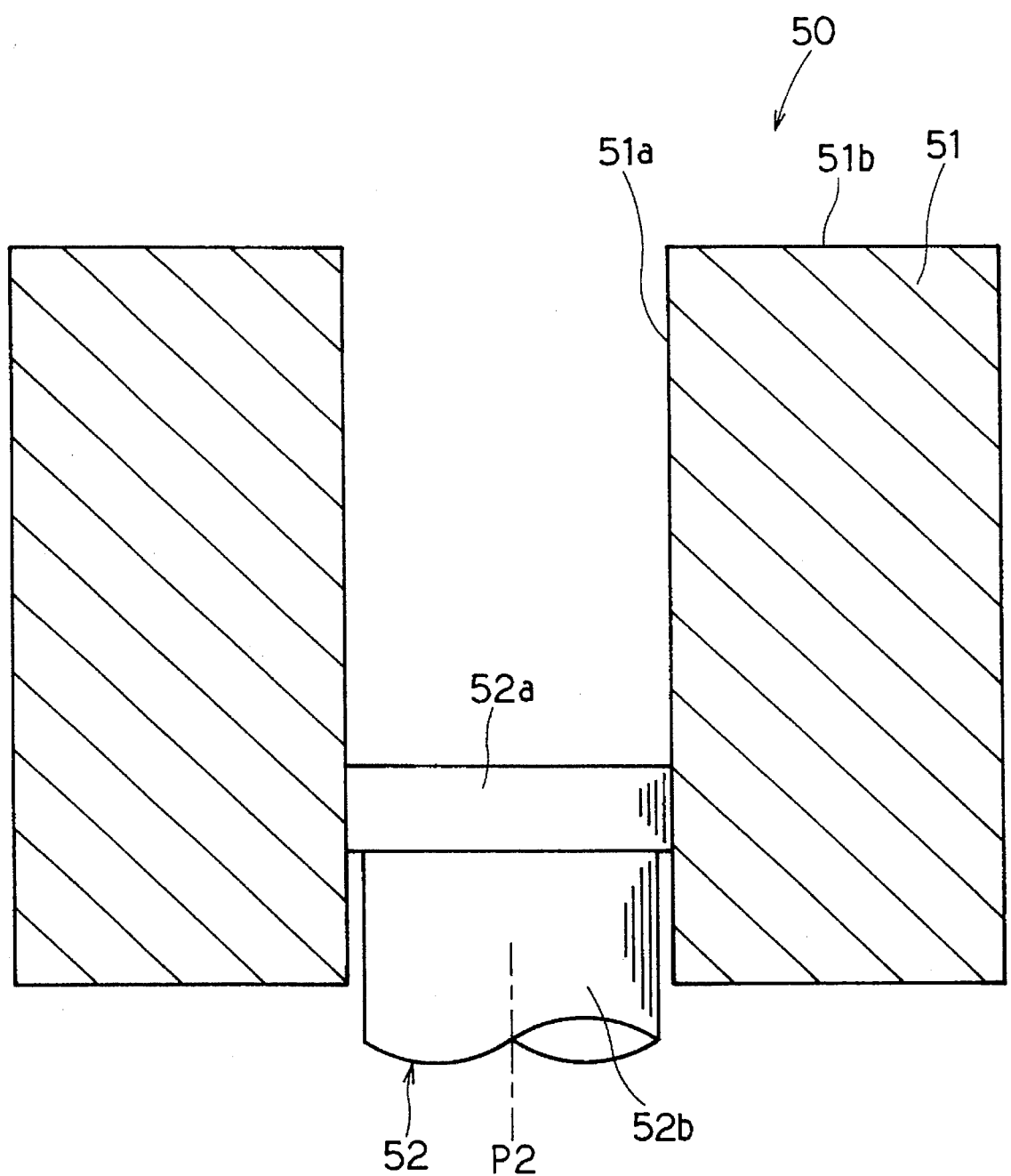
FIG. 11 is an elevational sectional view of a part of a forming apparatus in step 1 of the method of making a ferromagnetic body and cover assembly for a permanent-magnet rotor of a dc motor, according to the second embodiment of the present invention.

Reference is first made to FIG. 11. A forming apparatus 50 has a cylindrical stationary metal mold 51 and a first moveable columnar metal mold 52, each of which is made of a steel selected from Alloy Tool Steels (JIS G 4404 SKD, corresponding to ASTM A681). The stationary metal mold 51 has a vertical bore 51a and a top 51b, and the first moveable metal mold 52 has a top section 52a, having a flat top surface, and a body section 52b below the top section 52a. The diameter of the top section 52a is greater than the diameter of the body section 52b but slightly smaller than the diameter of the bore 51a. The first moveable metal mold 52 is coaxially disposed in the bore 51a with respect to a common imaginary longitudinal center axis P2 in a manner that the top section 52a is at the top thereof and is vertically moveable in the bore 51a sliding along the periphery thereof.

Step 1: Referring to FIG. 11, the first moveable metal mold 52 is moved in the bore 51a and stopped at a proper position so that the top section 52a thereof is at a predetermined level in a lower part of the bore 51a.

Figure 12:
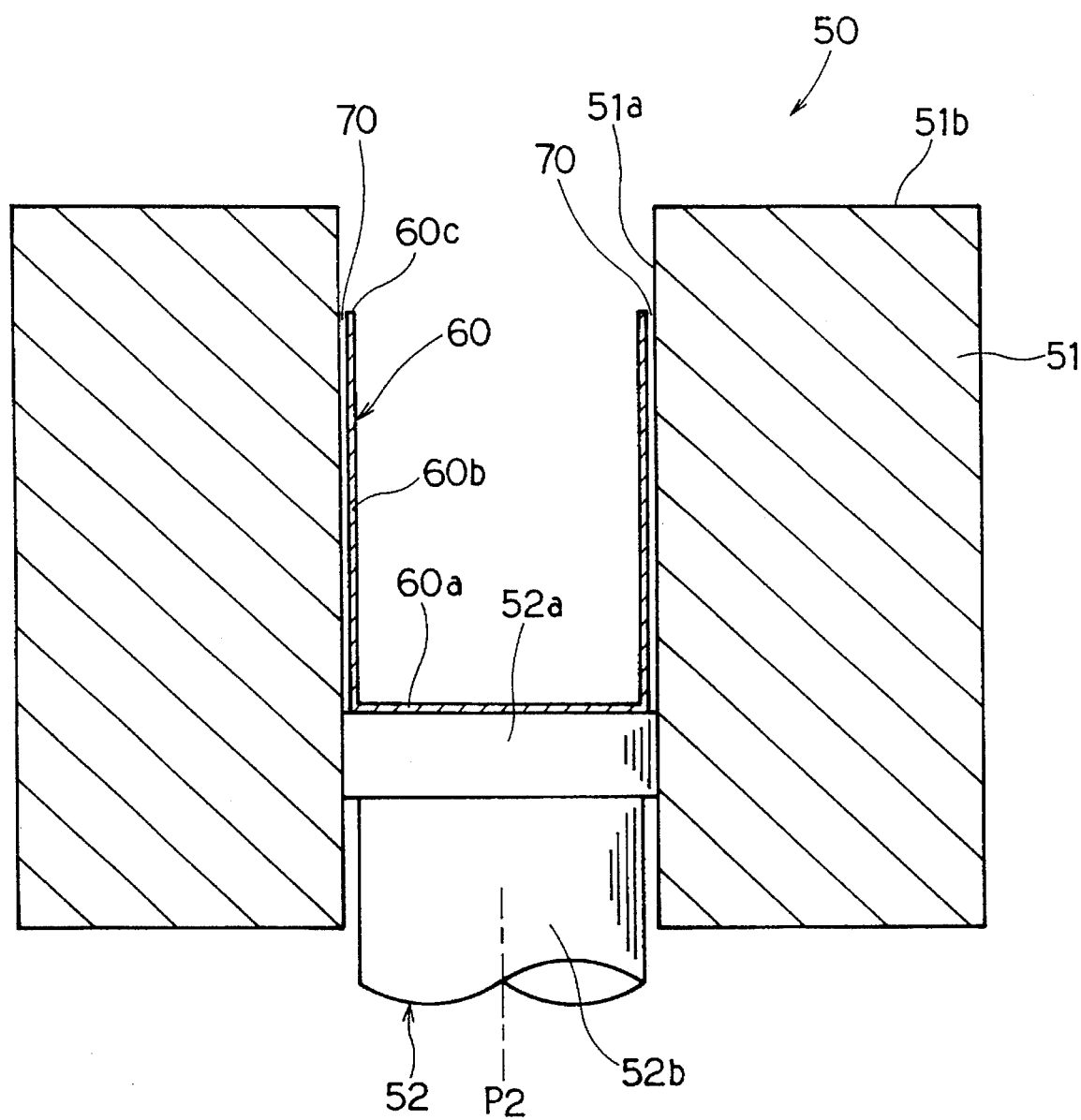
FIG. 12 is an elevational sectional view of a part of the apparatus and a material in step 2 subsequent to step 1.

Step 2: Referring to FIG. 12, a generally cup-shaped cover material 60, which has a flat disc-shaped bottom 60a, a cylindrical side wall 60b with an open top end 60c, is prepared. The cover material 60 is made of a thin nonmagnetic stainless steel sheet. Then, the cover material 60 is coaxially inserted to the bore 51a with the bottom 60a down in a manner that the bottom 60a is placed directly on the flat top surface of the top section 52a of the first moveable metal mold 52 and the top end 60c of the cover material 60 is positioned within the bore 51a. The external diameter of the cylindrical side wall 60b of the cover material 60 is made smaller than the diameter of the bore 51a so that a slight cylindrical gap 70 is formed between the exterior surface of the cylindrical side wall 60b and the peripheral wall of the bore 51a.

Figure 13:
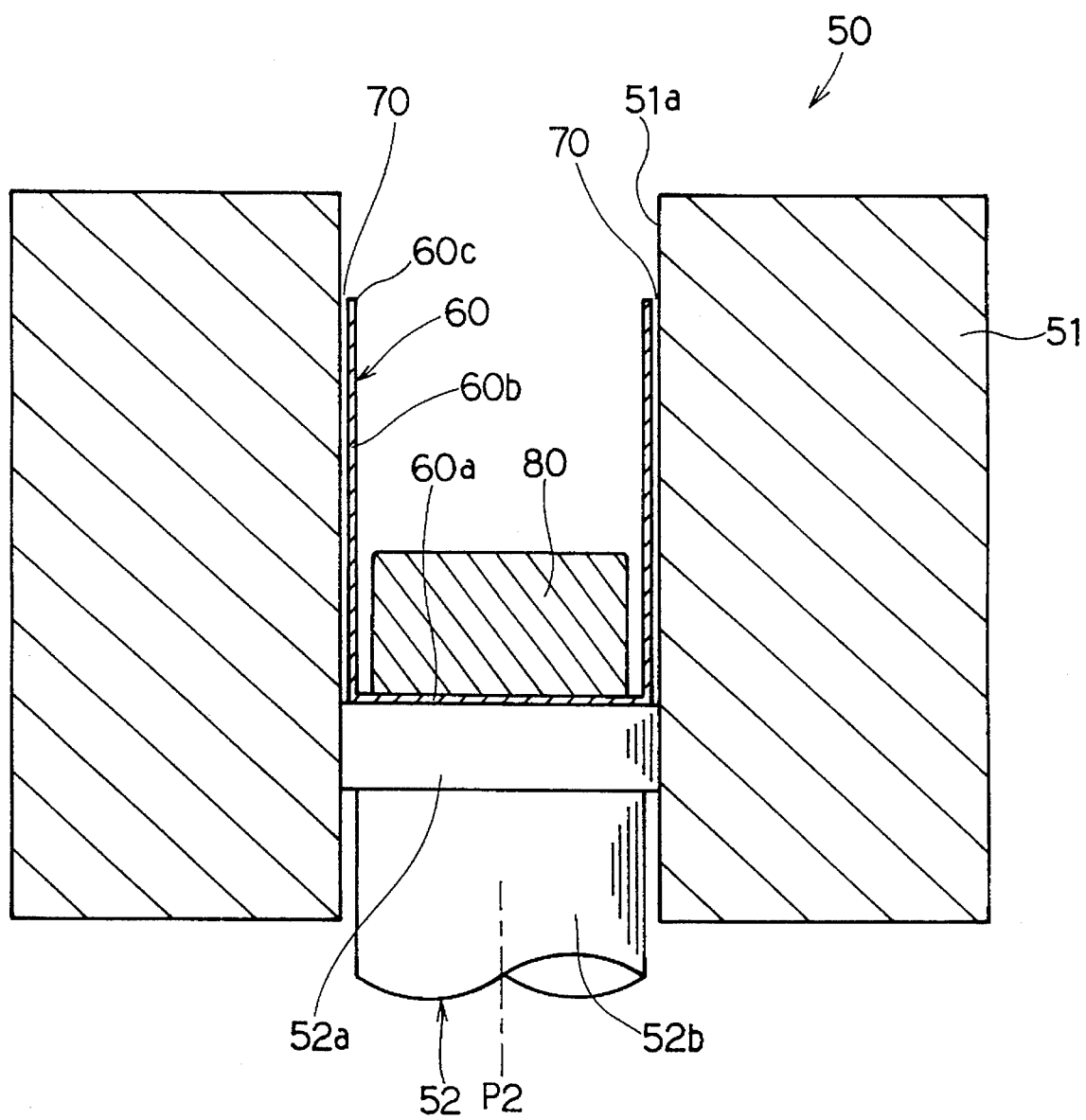
FIG. 13 is an elevational sectional view of a part of the apparatus and materials in step 3 subsequent to step 2.

Step 3: Referring to FIG. 13, a hot-pressed round pedestal-shaped block 80 of a ferromagnetic material is prepared. The material block 80 is substantially a compressed Nd—Fe—B based ferromagnetic alloy powder of a predetermined weight heated to a high temperature such as 800°

C. Then, the block 80 is put into the cover material 60 and placed on the bottom 60a thereof.

Figure 14:
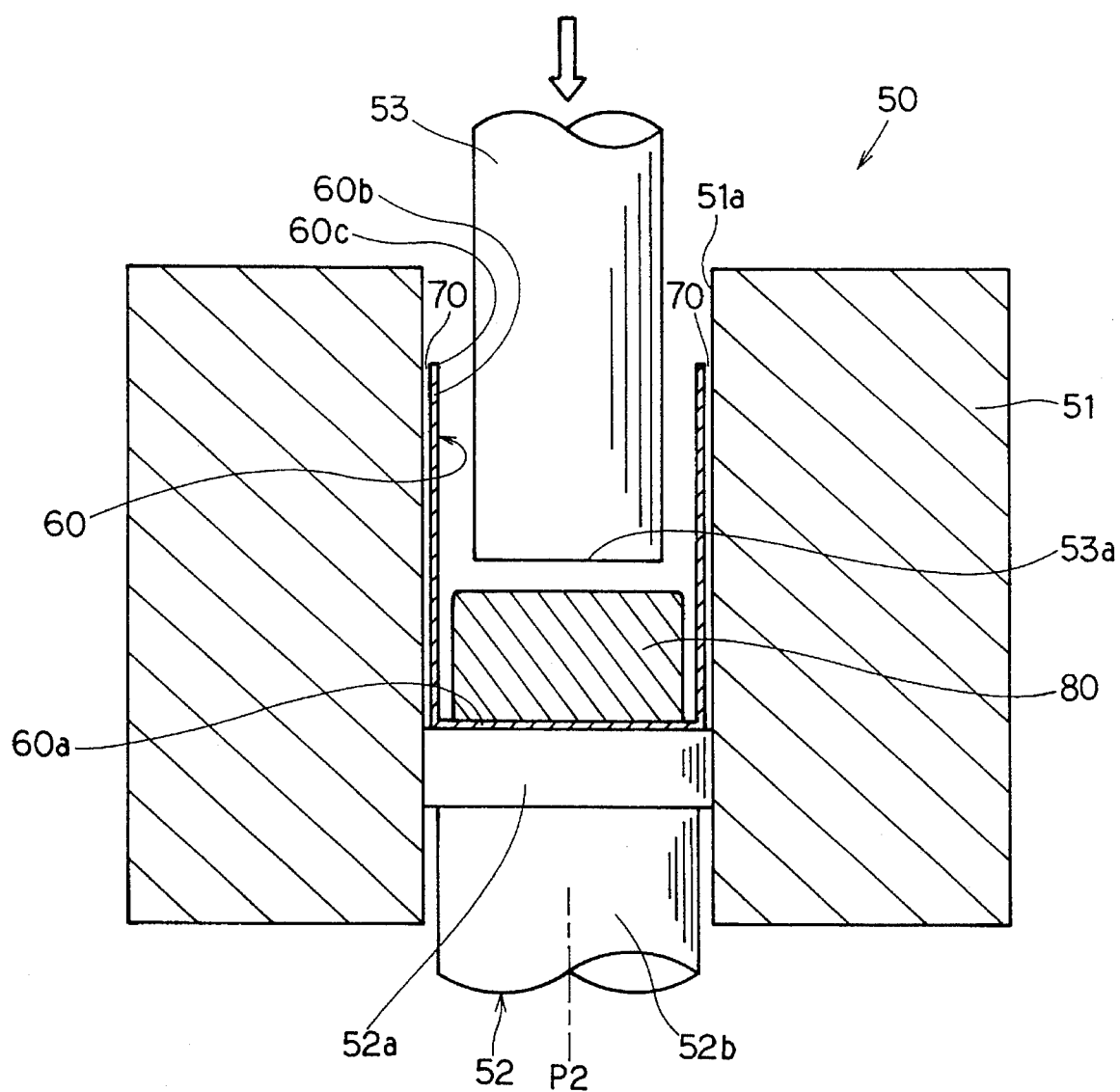
FIGS. 14–16 are elevational sectional views of parts of the apparatus and the materials in step 4 subsequent to step 5.
Figure 15:
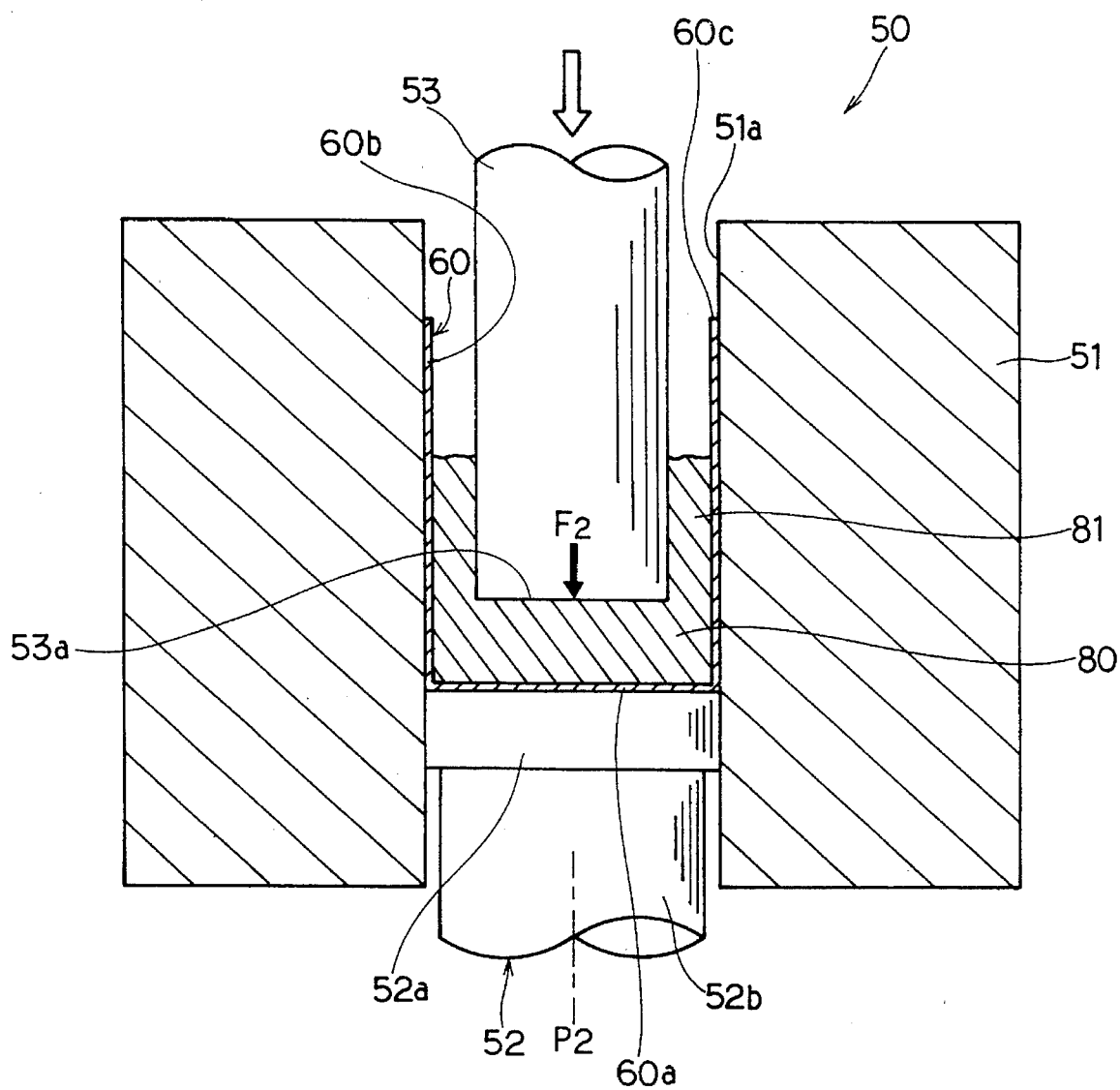
Figure 16:
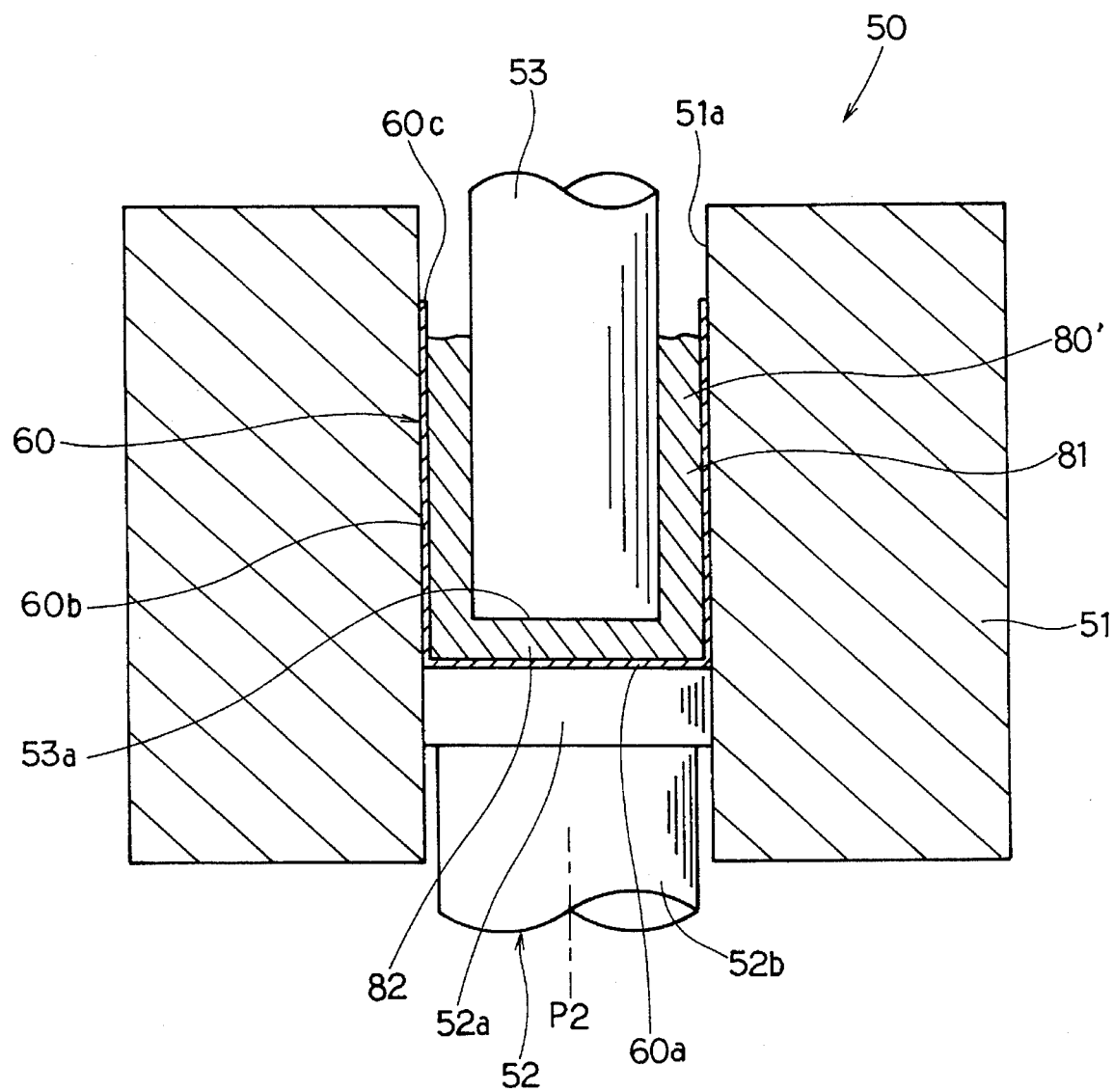

Step 4: Reference is now made to FIGS. 14, 15 and 16. In this step 4 is used a hot forming process of a hot working method, as described below.

The forming apparatus 50 further includes a columnar second moveable metal mold 53 that is made of the same steel material as of the stationary mold 51 or the first moveable metal mold 52. The diameter of the second moveable metal mold 53 is substantially smaller than the diameters of the bore 51a and the cylindrical side wall 60b by predetermined amounts. The second moveable metal mold 53 has a flat bottom surface 53a perpendicular to its longitudinal axis and is installed vertically moveable in and out of the bore 51a coaxially therewith.

The second moveable metal mold 53 is lowered into the bore 51a and, further, into the cover material 60 as indicated by the arrows in FIGS. 14 and 15 under a predetermined pressing force $F_2$. As the second moveable metal mold 53 continues to descend under the force, it starts to press the block 80 from the top thereof. Then, a part of the block 80 under the pressure comes up into the cylindrical space between the side wall 60b of the cover material 60 and the second moveable metal mold 53, and, consequently, a cylindrical riser part 81 of the block 80 is formed therein, as shown in FIG. 15. At this time, the cylindrical side wall 60b of the cover material 60 is biased radially outwardly by the pressured block 80, thereby expanding radially outwardly and reaching the periphery of the bore 51a, as shown in FIG. 15. Simultaneously, a radially inward counteractive force of the cylindrical wall 60b of the cover material 60 is created. Then, the block 80 and the cylindrical wall 60b are pressed against each other, whereby the block 80 and the cylindrical wall 60b firmly adhere to each other.

As the second moveable metal mold 53 progressively descends under the force, the cylindrical riser part 81 of the block 80 extends axially further upwardly, as shown in FIG. 16. The descending movement of the second moveable metal mold 53 is ceased when it has reached a predetermined level. At this time, a disc-shaped bottom part 82 is formed in the very bottom of the block 80 between the bottom surface 53a of the second moveable metal mold 53 and the bottom 60a of the cover material 60, as shown in FIG. 16. Thus, the block 80 is molded into an intermediate cup-shaped ferromagnetic material 80' in the cover material 60 firmly adhering thereto.

The internal and external diameters of the riser part 81 are selectively designed by properly determining the diameter of the bore 51a, the diameter of the second moveable metal mold 53, the thickness of the cylindrical wall 60b of the cover material 60 and the amount of the gap 70 (FIGS. 12–14). The process of this step 4 is preferably conducted in a nitrogen gas environment in order to prevent the Nd—Fe—B ferromagnetic alloy material from being oxidized.

Figure 17:
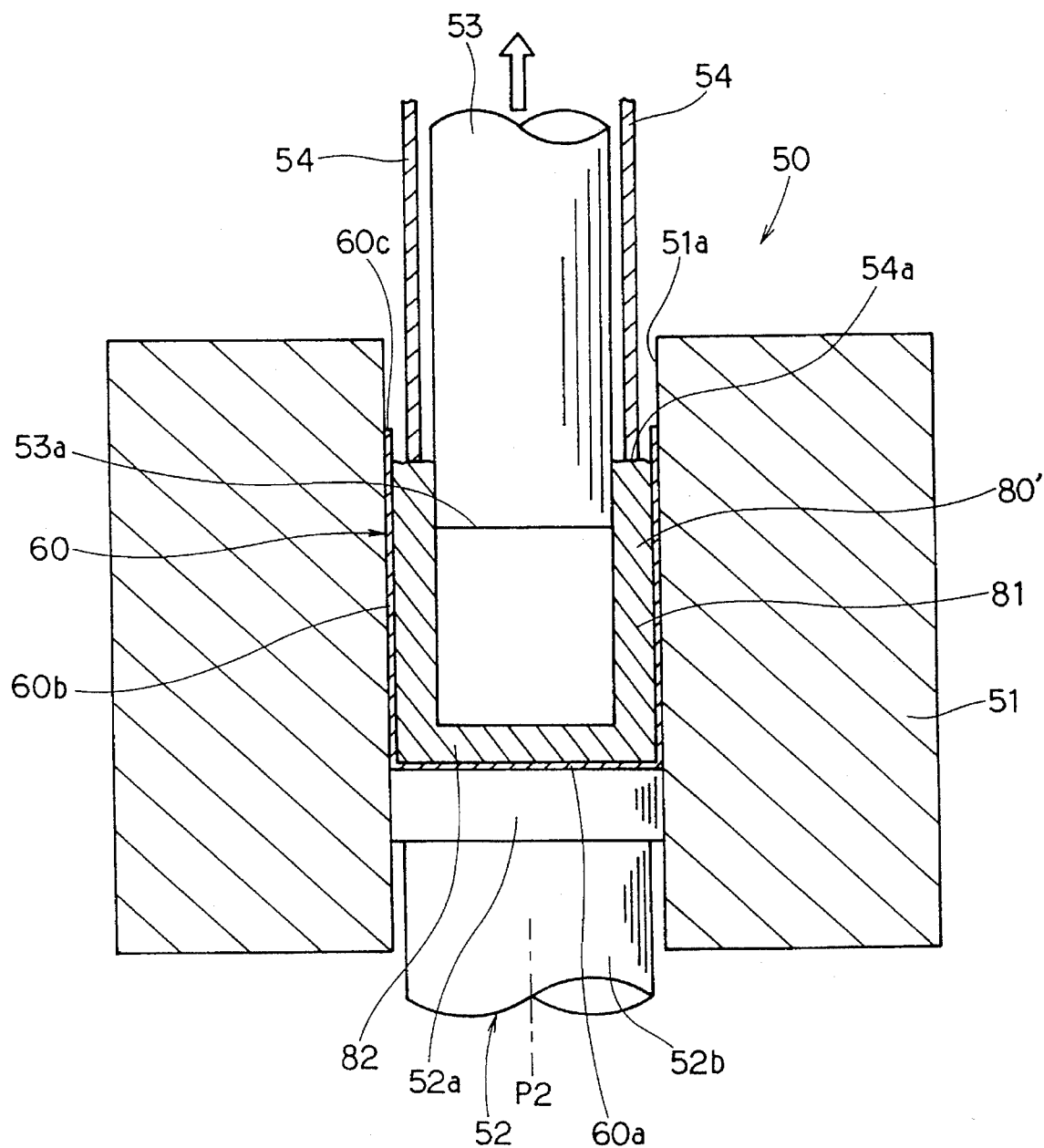
FIG. 17 is an elevational sectional view of a part of the apparatus and the materials in step 5 subsequent to step 4.

Step 5: Referring to FIG. 17, the apparatus 50 further includes a cylindrical stopper 54 that has an open bottom end 54a. The stopper 54 can be disposed coaxially with the second moveable metal mold 53 in a manner that the second metal mold 53 is inside the cylindrical stopper 54 and is vertically moveable, up or down. Subsequent to the step 4 as shown in FIG. 16, the stopper 54 is lowered from above the second metal mold 53 in a manner that the second moveable metal mold 53 is within the stopper 54 coaxially therewith until the bottom end 54a of the stopper 54 touches the top end of the intermediate cup-shaped ferromagnetic material 80'. Thereafter, as shown in FIG. 17, the second moveable metal mold 53 is moved up until the second moveable metal mold 53 is separated from the material 80'. At this time, the material 80' is kept from moving up with the second moveable metal mold 53 by the stopper 54. Subsequently, the stopper 54 is also removed.

Figure 18:
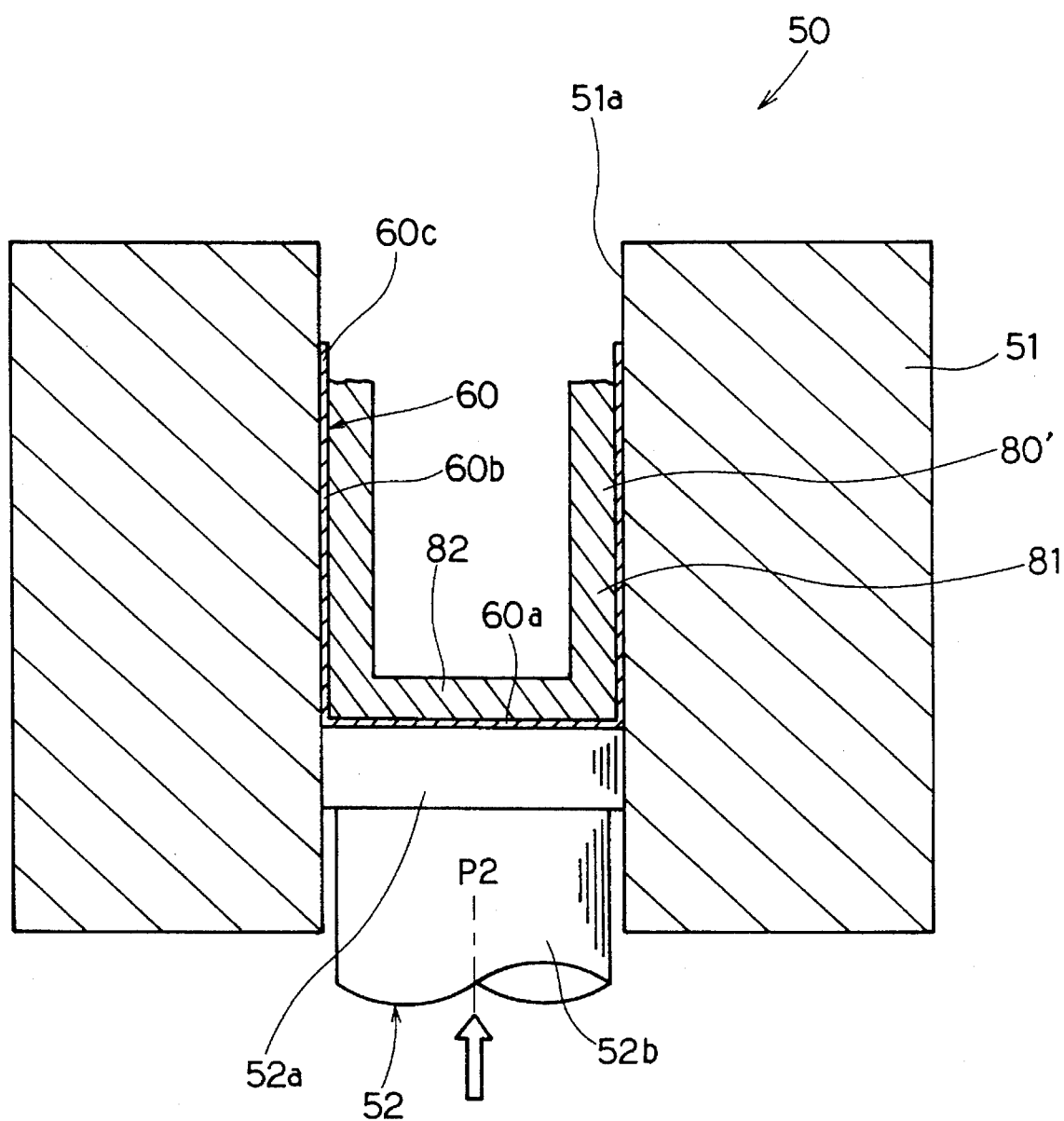
FIGS. 18–20 are elevational sectional views of parts of the apparatus and the materials in step 6 subsequent to step 5.
Figure 19:
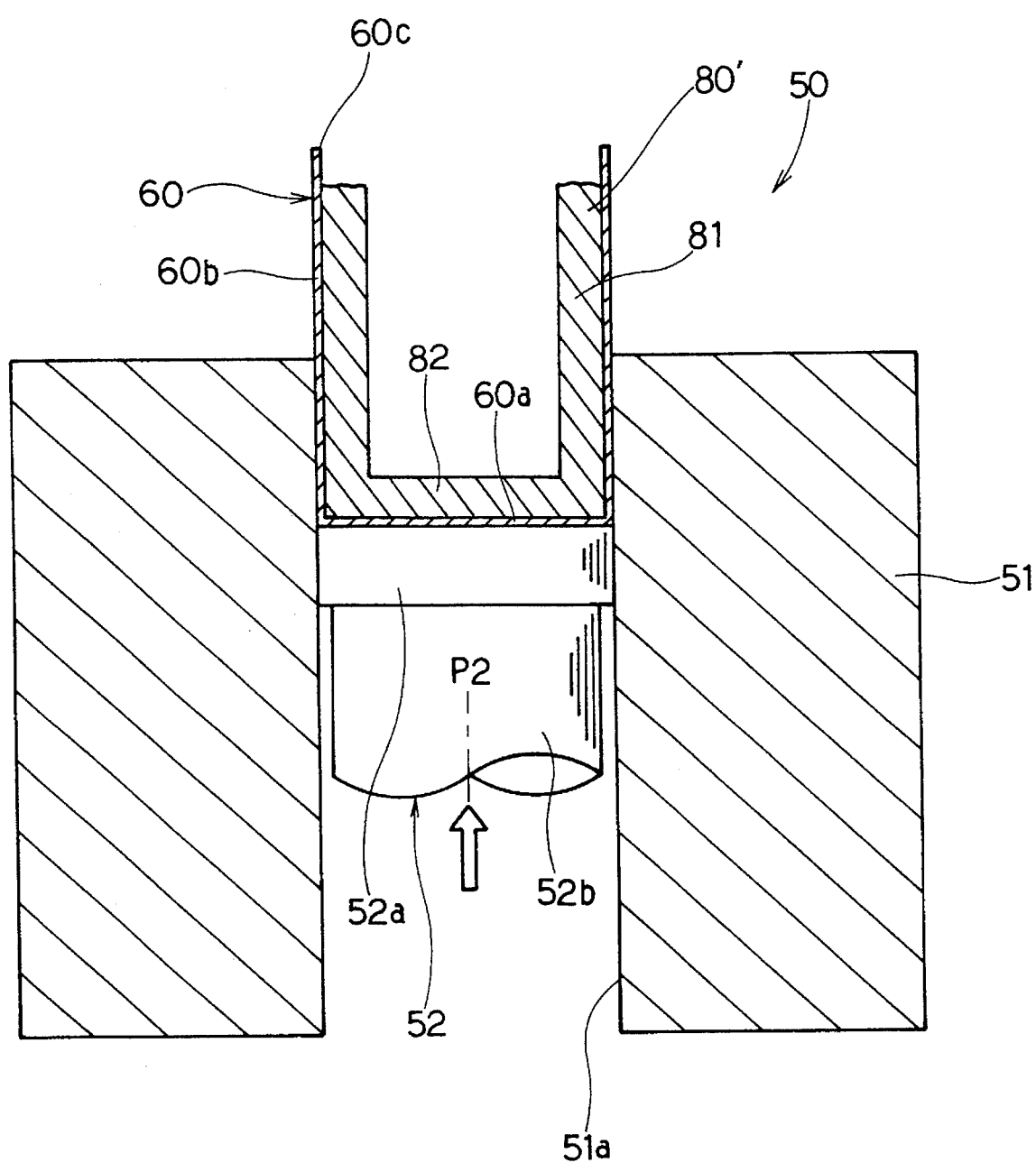
Figure 20:
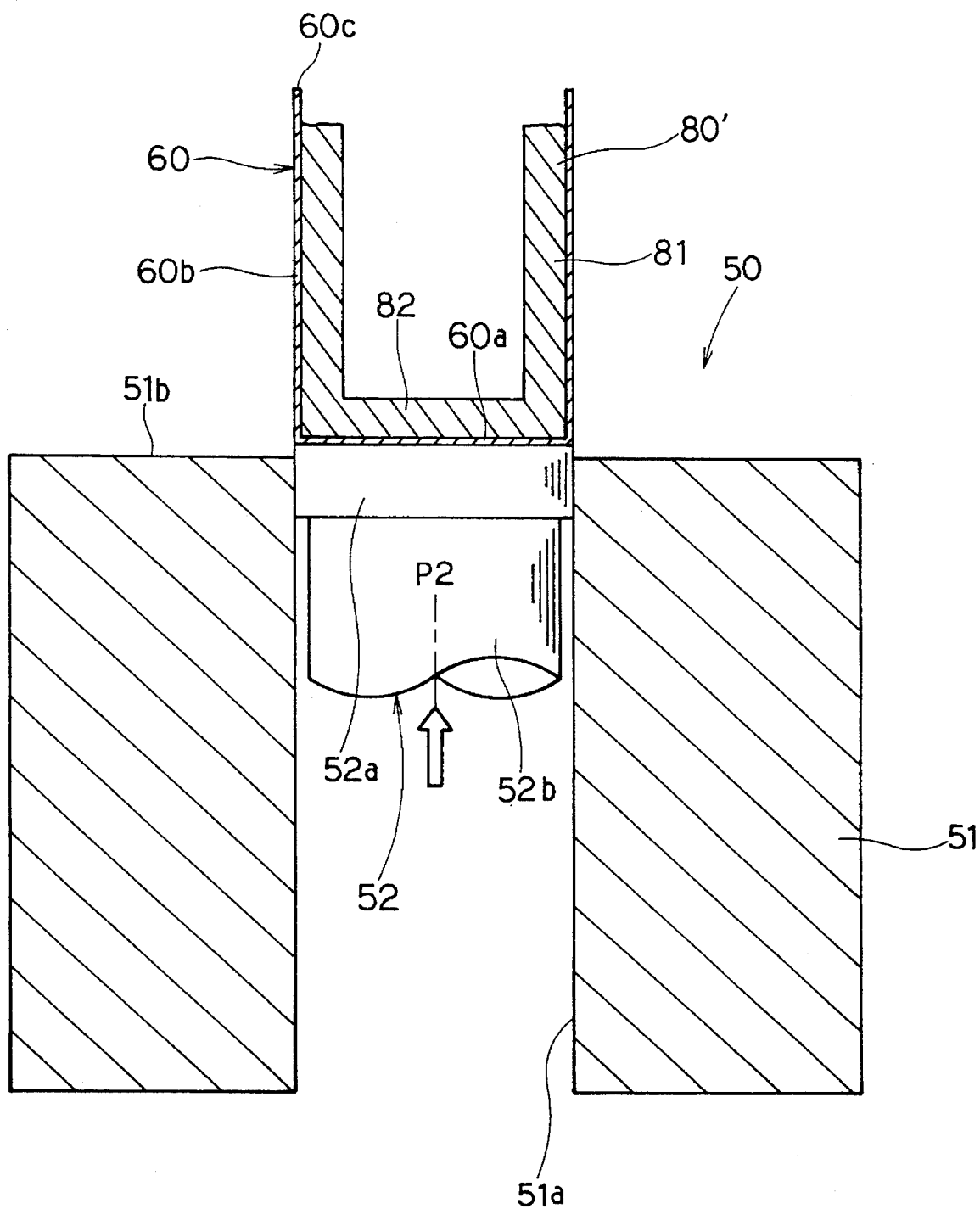

Step 6: Reference is now made to FIGS. 18, 19 and 20. After the stopper 54 has been removed, the first moveable metal mold 52 is moved upward as shown in FIGS. 18 and 19. The mold 52, passing the level shown in FIG. 19, reaches the level as shown in FIG. 20, where the bottom 60a of the cover material 60 is situated at a level slightly higher than the top 51b of the stationary mold 51.

Figure 21:
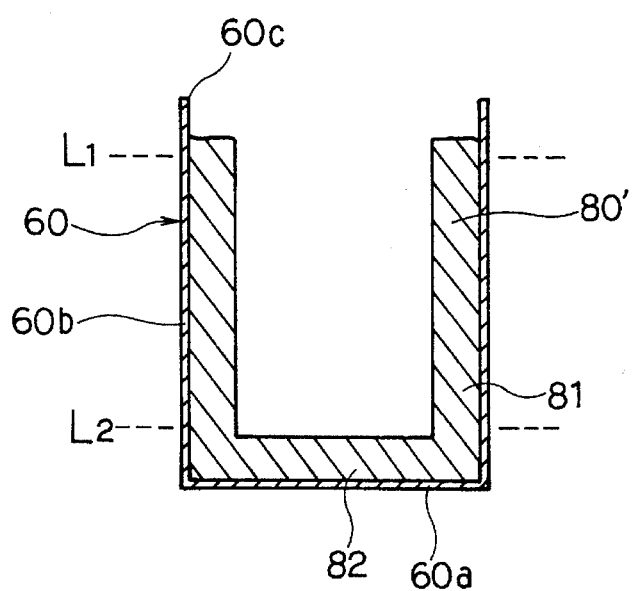
FIG. 21 is a view for step 7, showing an elevational sectional view of a formed ferromagnetic material and cover assembly produced according to steps 1 to 6.
Figure 22:
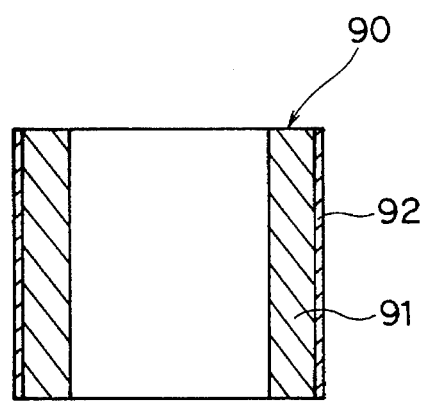
FIG. 22 is another view for step 7, showing an elevational sectional view of a cylindrical ferromagnetic body and cover assembly.

Step 7: Reference is next made to FIGS. 21 and 22. Subsequent to the step 6, the intermediate cup-shaped ferromagnetic material 80', which has been heated up to a high temperature, with the cower material 60 securely attached thereto, is removed from the apparatus 50 and is left to cool itself down to a normal room temperature. Then, a roughly formed top part and a bottom part of the cup-shaped ferromagnetic material 80', together with a top part and a bottom part, respectively, of the cover material 60, including the disc-shaped bottom part 82, are cut off at the levels shown in broken lines $L_1$ and $L_2$, respectively, in FIG. 21 by using a cutter (not shown) having an ultra-high hardness, such as a diamond cutter, so that, as shown in FIG. 22, a cylindrical ferromagnetic body and cover assembly 90 is formed. The cylindrical ferromagnetic body and cover assembly 90 now consists of a cylindrical Nd—Fe—B based ferromagnetic body 91 and a cylindrical exterior cover 92 securely attached thereto.

Although not shown, a cylindrical iron core will be securely fixed in the cylindrical ferromagnetic body 91, and, thereafter, the ferromagnetic body 91 is magnetized to obtain a core/permanent-magnet/cover assembly for a rotor of a dc motor.

As mentioned above, the cylindrical ferromagnetic body 91 and the cylindrical cover 92 are securely attached to each other in the process of making the cup-shaped material 80'. In other words, no separate step, such as a process by a cold-pressing method or a heat-shrink fitting method, is required to attach the cover 92 onto the body 91.

Furthermore, since no cold-pressing or heat-shrink fitting method is applied, the tolerance for the diametric dimension of the cup-shaped material 80' need not be overly strictly controlled.

Other effects and benefits pertaining to the second embodiment of the present invention are the same as in the case of the first embodiment, as mentioned above.

It will be understood that various changes and modifications may be made in the above described embodiments which provide the characteristics of the present invention without departing from the spirit and principle thereof particularly as defined in the following claims.

What is claimed is:

1. A method of making a cylindrical ferromagnetic body and cover assembly for a rotor of a dc motor, the method comprising the steps of:

(a) preparing a generally cylindrically-shaped non-magnetic cover element, said cover element having a cylindrical body having a top end and an outwardly extending annular flange around said top end;

(b) forming an elongated vertical cylindrical space by said cover element and a plurality of molds, said elongated cylindrical space being coaxial with said cylindrical body of said cover element and partially defined by a cylindrical internal periphery of said cylindrical body of said cover element;

(c) depositing a predetermined quantity of a powdered ferromagnetic material including a heat-curable binder in said vertical cylindrical space;

(d) compressing downwardly said powdered ferromagnetic material deposited in said vertical cylindrical space to form a cylindrically-molded ferromagnetic material in a manner that the top thereof is at a level in a proximity of the level of said annular flange;

(e) heating up said cylindrically-molded ferromagnetic material to a predetermined high temperature so that said heat-curable binder is cured and said cylindrically-molded ferromagnetic material firmly adheres to said cover element; and (f) bending said annular flange of said cover element radially inwardly over to a top of said cylindrically-molded ferromagnetic material so as to obtain a cylindrical ferromagnetic body and cover assembly.

2. A method of making a cylindrical ferromagnetic body and cover assembly for a rotor of a dc motor, the method comprising the steps of:

(a) preparing a stationary mold having a vertical cylindrical first bore that has a first diameter and an imaginary longitudinal center axis;

(b) preparing a columnar guide having a second diameter that is substantially smaller than said first diameter;

(c) placing said columnar guide vertically in said first bore coaxially therewith, thereby forming a cylindrical space defined by a cylindrical side surface of said columnar guide and a cylindrical periphery of said first bore;

(d) preparing a first cylindrical mold having an external diameter slightly smaller than the diameter of said first bore and an internal diameter slightly greater than the diameter of said columnar guide;

(e) mounting slidably said first cylindrical mold on said columnar guide coaxially therewith;

(f) inserting said first cylindrical mold to said first bore coaxially therewith in a manner that said first cylindrical mold is axially moveable within said cylindrical space;

(g) preparing a generally cylindrically-shaped non-magnetic metal cover element, said cover element having a cylindrical body having a top end and a radially outwardly extending annular flange around said top end, the exterior diameter of said cylindrical body being slightly smaller than the diameter of said first bore;

(h) inserting said cylindrical body of said cover element to said first bore in a manner that said cylindrical body is on top of said first cylindrical mold and said annular flange rests on top of said stationary mold;

(i) preparing a second mold having a cylindrical second bore whose diameter is substantially equal to the inside diameter of said cylindrical body of said cover element;

(j) placing said second mold on top of said stationary mold and said annular flange in a manner that a part of said columnar guide is within said second bore and said first bore, said second bore and said columnar guide are axially aligned with one another having said center axis in common so that a combined cylindrical space is formed, said combined cylindrical space being defined by a cylindrical side surface of said columnar guide, the internal cylindrical periphery of said cylindrical body of said cover element and the cylindrical periphery of said second bore;

(k) depositing a predetermined quantity of a powdered ferromagnetic material including a heat-curable binder in said combined cylindrical space;

(l) compressing downwardly said powdered ferromagnetic material deposited in said combined cylindrical space to form a cylindrically-molded ferromagnetic material in a manner that the top thereof is at a level in a proximity of the level of said annular flange;

(m) heating up said cylindrically-molded ferromagnetic material to a predetermined high temperature so that said heat-curable binder is cured and said cylindrically-molded ferromagnetic material is hardened while being securely attached by said cover element;

(n) placing an annular protector on said cylindrically-molded ferromagnetic material; and (o) bending said annular flange radially inwardly over onto said annular protector so as to obtain a cylindrical ferromagnetic body and cover assembly.

3. A method of making a cylindrical ferromagnetic body and cover assembly according to claim 2, wherein said first stationary mold has an annular recess at a top thereof around said first bore so as to accept said annular flange therein.

4. A method of making a cylindrical ferromagnetic body and cover assembly according to claim 2, wherein said stationary mold is heated up to a predetermined high temperature so that said cylindrically-molded ferromagnetic material is heated through said cover element.

5. A method of making a cylindrical ferromagnetic body and cover assembly for a rotor of a dc motor, the method comprising the steps of:

(a) preparing a first mold and a second mold, said first mold having a vertical cylindrical bore that has a first diameter and an imaginary longitudinal center axis, said second mold having a circular top surface that is disposed in said bore in a manner that said top surface is in a plane perpendicular to said center axis;

(b) preparing a cup-shaped non-magnetic cover material having a flat disc-shaped bottom and a cylindrical side wall with an open top end, said cylindrical side wall having an external diameter smaller than said first diameter;

(c) placing said cover material in said bore in a manner that said flat disc-shaped bottom is on said circular top surface and said cylindrical side wall is coaxial with said bore;

(d) depositing a heated block of a powdered ferromagnetic material in said cover material;

(e) pressing said block downwardly by a columnar mold having a diameter substantially smaller than an internal diameter of said cylindrical side wall of said cup-shaped cover material in a manner that said columnar mold is maintained coaxial with said cylindrical side wall so that said block is formed into a cup-shaped form in said cover material so as to form an intermediate cup-shaped ferromagnetic material and cover assembly;

(f) cooling down said intermediate cup-shaped ferromagnetic material and cover assembly; and (g) cutting off a top part and a bottom part of said cup-shaped intermediate ferromagnetic material and cover assembly so as to obtain a cylindrical ferromagnetic body and cover assembly.

6. A method of making a cylindrical ferromagnetic body and cover assembly according to claim 5, wherein a slight cylindrical gap is present between said cylindrical wall of said cover material and a peripheral wall of said bore so that said cylindrical wall is allowed to slightly expand radially outwardly to make contact with the peripheral wall of said bore when said block is pressed by said columnar mold.

7. A method of making a cylindrical ferromagnetic body and cover assembly for a rotor of a dc motor, the method comprising the steps of:

(a) preparing a stationary mold having a vertical cylindrical bore that has a first diameter and an imaginary longitudinal center axis;

(b) preparing a first moveable mold having a circular top section with a flat top surface, said circular top section having a diameter slightly smaller than said first diameter;

(c) inserting said first moveable mold into said bore in a manner that said top surface is in a plane perpendicular to said center axis;

(d) preparing a generally cup-shaped cover material made of a non-magnetic metal, said cover material having a flat disc-shaped bottom and a cylindrical side wall with an open top end, the external diameter of said cylindrical wall being smaller than said first diameter;

(e) placing said cover material into said bore coaxially therewith from a top opening thereof in a manner that said bottom of said cover material is placed directly on said flat top surface of said first moveable mold and said top end is located within said bore;

(f) depositing a heated block of a powdered ferromagnetic material in said cup-shaped cover material;

(g) preparing a columnar second moveable mold having a flat bottom surface, the external diameter of said columnar second moveable mold being substantially smaller than the internal diameter of said cylindrical side wall of said cup-shaped cover material;

(h) moving down said columnar second moveable mold into said bore coaxially therewith in a manner that said bottom surface is in a plane perpendicular to said center axis;

(i) pressing down said columnar second moveable mold under a predetermined force so that a low section of said columnar second moveable mold is vertically pressed into said block, and, consequently, a part of said heated block rises upward in a cylindrical space formed between said columnar second moveable mold and said side wall, and said heated block is molded into a cup-shaped form in said cover material securely adhering thereto so that an intermediate cup-shaped ferromagnetic material and cover assembly is formed;

(j) cooling down said intermediate cup-shaped ferromagnetic material and cover assembly; and (k) cutting off a top section and a bottom section of said cup-shaped intermediate ferromagnetic material and cover assembly so as to obtain a cylindrical ferromagnetic body and cover assembly.

8. A method of making a cylindrical ferromagnetic body and cover assembly according to claim 7, wherein a slight cylindrical gap is present between said cylindrical wall of said cover material and a peripheral wall of said bore so that said cylindrical wall is allowed to slightly expand radially outwardly to make contact with the peripheral wall of said bore when said block is pressed by said columnar second moveable mold.

* * * * *